United States Patent
Carpenter

[11] 3,823,995
[45] July 16, 1974

[54] METHOD OF FORMING LIGHT FOCUSING FIBER WAVEGUIDE

[75] Inventor: Larry L. Carpenter, Corning, N.Y.

[73] Assignee: Corning Glass Works, Corning, N.Y.

[22] Filed: Mar. 30, 1972

[21] Appl. No.: 239,626

[52] U.S. Cl............... 350/96 WG, 65/3, 65/4, 65/18, 65/30, 65/32, 65/33, 65/120, 65/121
[51] Int. Cl.... G02b 5/14, C03b 23/20, C03b 25/00
[58] Field of Search......... 65/3, 121, 4, 30, DIG. 7, 65/32, 18, 120, 33; 350/96 WG, 175 GN

[56] References Cited
UNITED STATES PATENTS

| | | | |
|---|---|---|---|
| 2,967,113 | 1/1961 | Liebhafsky et al. | 65/32 |
| 3,157,726 | 11/1964 | Hicks, Jr. et al. | 65/3 X |
| 3,271,179 | 9/1966 | Smith, Jr. | 65/DIG. 7 |
| 3,614,197 | 10/1971 | Nishizawa | 65/DIG. 7 |

*Primary Examiner*—Frank W. Miga
*Attorney, Agent, or Firm*—Walter S. Zebrowski; Clarence R. Patty, Jr.

[57] ABSTRACT

A method of forming an article such as a light focusing fiber waveguide by applying to a substantially cylindrical starting member a plurality of layers of material, each layer having a progressively lower index of refraction. The assembly so formed is heated and drawn to reduce the cross-sectional area to form a fiber having a stepped radially varying composition. Alternatively, a plurality of layers of material, each having a progressively higher index of refraction are applied to the inner surface of a tubular member. The resulting substantially cylindrical hollow assembly is heated and drawn to reduce the cross-sectional area and to collapse the remaining inner hole to form a fiber having a solid cross-sectional area with a stepped radially varying composition.

29 Claims, 9 Drawing Figures

PATENTED JUL 16 1974    3,823,995

METHOD OF FORMING LIGHT FOCUSING FIBER WAVEGUIDE

BACKGROUND OF THE INVENTION

1. Field of the Invention

A transverse-gradient cylindrical article is here defined to be a cylinder of transparent dielectric material, such as glass or plastic, possessing a substantially axially symmetrical but stepped radially varying composition and consequently a stepped radially varying refractive index. The diameter of the article is large enough so that a beam of light undulating about the axis does not strike the lens-atmosphere interface.

Operational theories and other pertinent information concerning lenses and optical waveguides may be found in "Solutions of Two Optical Problems" by A. Fletcher, T. Murphy and A. Yound, Proc. Roy. Soc. (London), Vol. 223, pages 216–225, 1954; "Geometrical Optics of Parabolic Index-Gradient Cylindrical Lenses" by F. P. Kapron, Journal of the Optical Society of America, Vol. 60, No. 11, pages 1433–1436, Nov. 1970; U.S. Pat. No. 3,157,726 issued to Hicks et al., in the publication entitled "Cylindrical Dielectric Waveguide Mode" by E. Snitzer, Journal of the Optical Society of America, Vol. 51, No. 5, pages 491–498, May 1961; and in "Fiber Optics Principles and Applications" by N. S. Kapany, Academic Press, 1967.

2. Description of the Prior Art

A method heretofore used for producing light focusing waveguides has been employed by the Nippon Selfoc Company, Ltd. for the production of glass fiber waveguides under the tradename "Selfoc." Such waveguides have been produced primarily by drawing fibers from a conventional glass melt and then subsequently subjecting the fibers to an ion exchange process to develop the desired gradient refractive index. There are many problems with such waveguides, one of the primary ones being high attenuation resulting from the inherent impurity level in the glass. Other difficulties are getting a sufficient depth of ion exchange and controlling refractive index gradient.

SUMMARY OF THE INVENTION

It is an object of the present invention to provide an article having a varying composition and more particularly a method for economically producing a light focusing fiber waveguide which overcomes the heretofore noted disadvantages.

Other objects of the present invention are to provide a method for forming a light focusing fiber waveguide which reduces the level of impurities present in the material and which reduces attenuation so as to permit utility of the waveguide for long distance applications.

Broadly, according to this invention, an article having a varying or gradient chemical composition is produced by first providing a substantially cylindrical starting member and applying to the peripheral surface thereof a plurality of layers of material, each layer having a progressively different composition whereby the resulting structure has a stepped radially varying composition. The structure is then heated to sinter or consolidate the layers as necessary. Thereafter, the starting rod or member is removed if desired. If the starting member is removed, the resulting cylindrical hollow structure is heated to a temperature at which the materials have a low enough viscosity for drawing and drawn to reduce the diameter thereof until the inner walls of the hollow structure collapse, that is the longitudinal hole is sealed and a solid rod is formed. Thereafter, if desired, continued drawing of the member further reduces the diameter thereof to form an article, such as a light focusing fiber waveguide. If the starting rod is not removed, the structure may either be maintained at or heated to the drawing temperature and drawn as above described to the desired shape.

As another embodiment, a plurality of layers of material may be applied to the inside wall surfaces of a hollow tubular member, each layer having a progressively different composition whereby the resulting structure similarly has a stepped radially varying composition. The resulting substantially cylindrical hollow assembly is heated and drawn as described in connection with the embodiment wherein the inner starting member is removed.

These and additional objects, features and advantages of the present invention will become apparent to those skilled in the art from the following detailed description and the attached drawings on which, by way of example, only the preferred embodiments of this invention are illustrated.

DETAILED DESCRIPTION OF THE INVENTION

It is to be noted that the drawings are illustrative and symbolic of the present invention and there is no intention to indicate the scale or relative proportions of the elements shown therein. For the pruposes of simplicity, the present invention will be described in connection with the formation of a light focusing fiber waveguide although this invention is not intended to be limited thereto.

Figure 1:
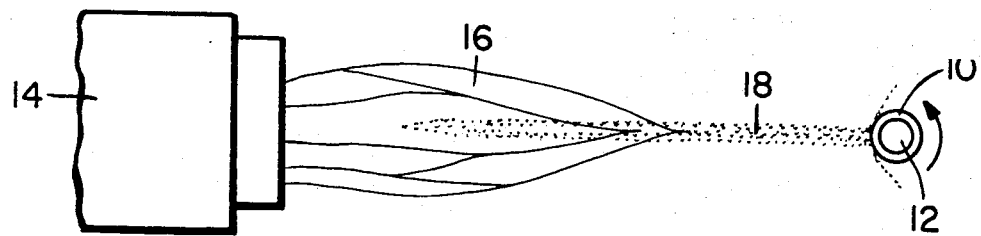
FIG. 1 is an illustration of a means for applying a first thin layer of glass soot to a starting member.

Referring to FIG. 1, the first of a plurality of layers 10 of glass is applied to a substantially cylindrical glass starting member or rod 12 by means of flame hydrolysis burner 14. Fuel gas and oxygen or air are supplied to burner 14 from a source not shown. This mixture is burned to produce flame 16 which is emitted from the burner. A gas-vapor mixture is hydrolyzed within flame 16 to form a glass soot that leaves flame 16 in a stream 18 which is directed toward starting member 12. The flame hydrolysis method of forming layers 10 is hereinafter described in detail. Starting member 12 is suitably supported and is rotated and translated for uniform deposition of the soot. It is to be understood that an elongated ribbon burner, not shown, that provides a long stream of soot could be used in place of the substantially concentric burner illustrated in FIG. 1, whereby starting member 12 would only have to be rotated. Further, a plurality of burners 14 could be employed in a row to similarly require only rotation.

Figure 2:
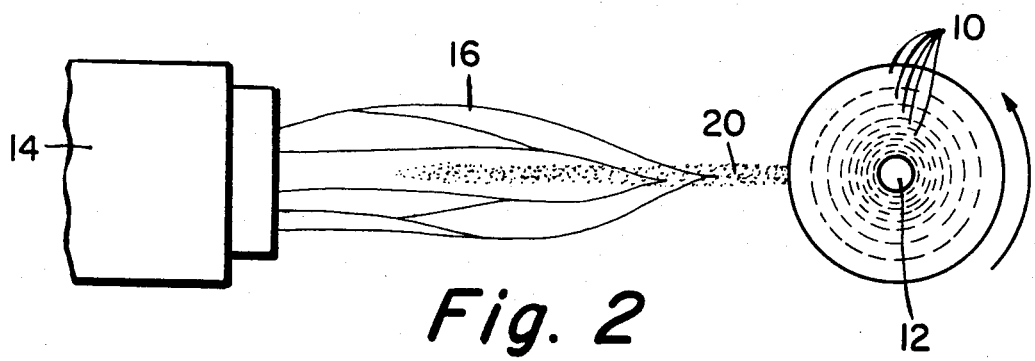
FIG. 2 is an illustration of a structure having a plurality of thin layers.

After first layer 10 is applied to the starting member, the gas-vapor mixture is changed for each successive layer 10 so that each of the plurality layers have a composition whereby the desired stepped radially varying composition is obtained. The application of the successive layers 10 is illustrated in FIG. 2 wherein outer layer 10 is being applied by means of stream 20 of soot having a predetermined desired composition varying as necessary from that of the other layers.

In the manufacture of optical waveguides, the material of layers 10 should be formed from a glass having a minimum light absorption characteristic, and although any optical quality glass may be used, a particularly suitable base glass from which to make a light focusing fiber waveguide is fused silica. Since such a waveguide must have a radially gradient index of refraction, it must therefore have a radially varying composition. Accordingly, each layer 10 may be formed from fused silica doped with a different quantity or kind of material to provide a layer having the desired index of refraction.

There are many suitable materials that can satisfactorily be used as a dopant alone or in combination with each other. These include, but are not limited to, titanium oxide, tantalum oxide, tin oxide, niobium oxide, zirconium oxide, aluminum oxide, lanthanum oxide, and germanium oxide. The maximum amount of dopant used should be kept to a minimum for at least the reason that an excessive amount of doping material will result in a loss of light transmission. Desirably, the maximum amount of dopant to be added is the minimum amount which will yield the desired index of refraction of the glass. For the purpose of the light focusing fiber waveguide of the present invention, the maximum amount of dopant at any point of the article is preferably maintained below about 25 percent by weight of the total composition at that point.

A particularly effective method of forming or applying layers 10 is accomplished by a flame hydrolysis process similar to that described in U.S. Pat. No. 2,272,342 issued to J. F. Hyde or U.S. Pat. No. 2,326,059 issued to M. E. Nordberg. A modification of the Nordberg process that will provide fused silica layers doped with varying amounts of titanium oxide is described hereinafter.

The thickness of each layer 10 is determined by the amount of soot deposited which is primarily controlled by the flow rate and the time allowed for deposition. To provide a dense, uniform coating, the soot applied may be sintered as deposited if the temperature is high enough, or it may thereafter be sintered in a subsequent operation. Sintering reduces the thickness of layers 10 due to the consolidation of the particles.

Figure 3:
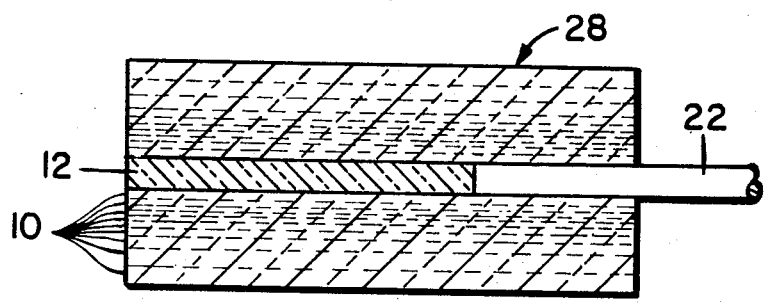
FIG. 3 is a fragmentary cross sectional elevation illustrating a means of removing the starting member.
Figure 8:
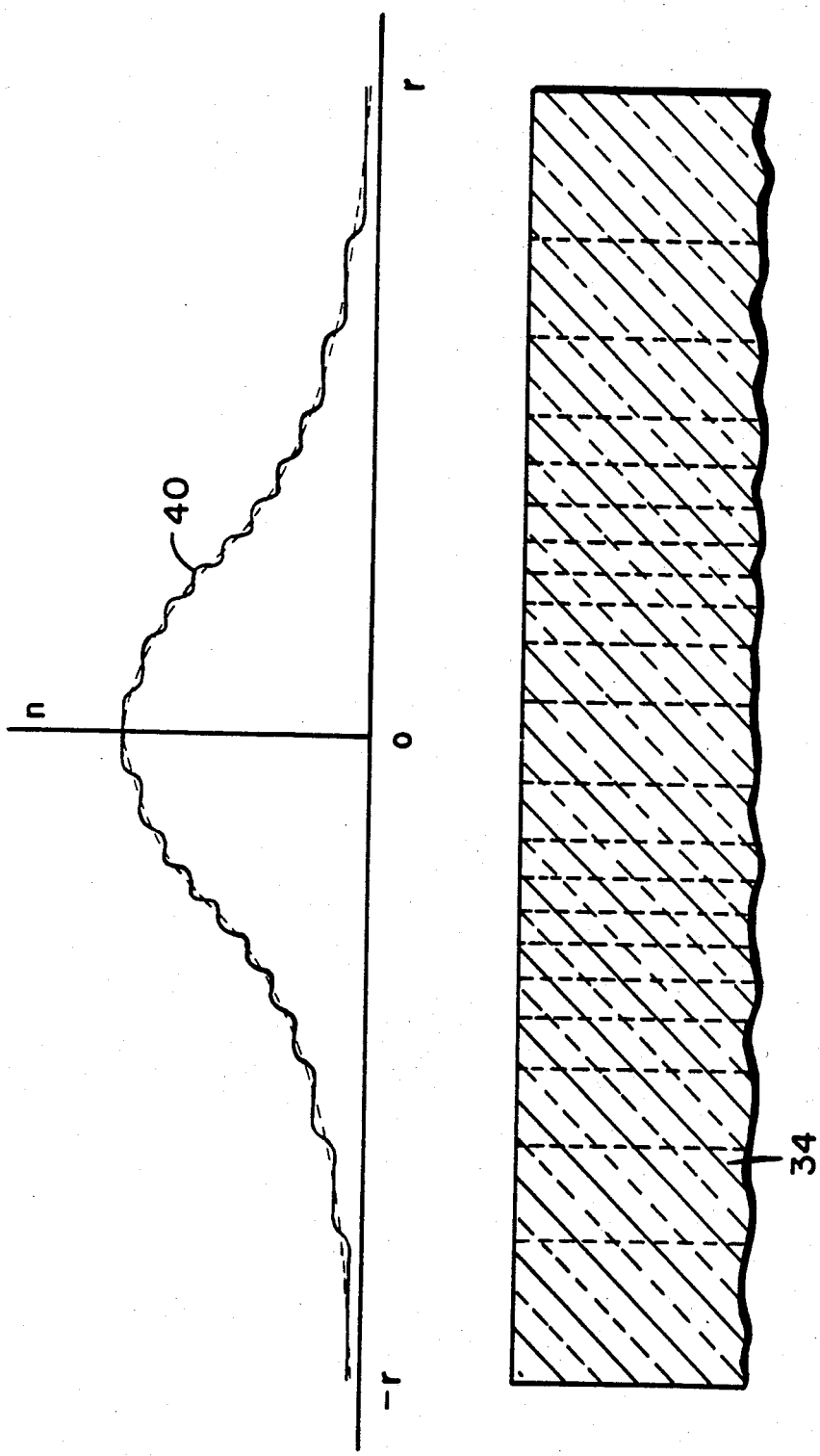
FIG. 8 is an illustration of the stepped radially varying composition of an optical waveguide formed in accordance with the present invention.

Referring to FIG. 3, the removal of starting member 12 is illustrated. Starting member 12 is shown being ground out by means of a diamond reamer 22, however, any other means for accomplishing this result is suitable, such for example as hydrofluoric acid etching, core drilling, or the illustrated in FIG. 8, that the high point this hole Since glass starting member 12 may be ultimately removed, the material of member 12 need only be such as to have a composition and coefficient of expansion compatible with the material of layers 10. A suitable material may be normally produced glass having a composition similar to that of layers 10. It may be normally produced glass having ordinarily or even an excessive level of impurity or entrapped bubbles that would otherwise render it unsuitable for effective light propagation. The starting member may also be formed of graphite or the like.

Figure 4:
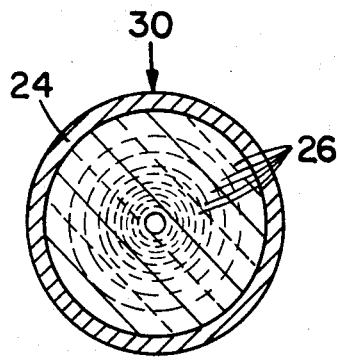
FIG. 4 is a cross sectional view of another embodiment of the present invention.

Another embodiment of the present invention is illustrated in FIG. 4, wherein tube 24 is shown to serve as the exterior structural member of the device being formed. In the formation of a light focusing optical waveguide, the material of tube 24 may be the same as the base material of the waveguide layers or may be normally produced glass having an ordinary or even an excessive level of impurities or entrapped bubbles depending on the intensity of the light propagated by the waveguide within the exterior structural portion formed from tube 24.

Tube 24 may be produced by core drilling a solid rod of material such as glass. The rough surfaces left by drilling may be smoothed by one or more methods such, for example, as laser milling the inside surface, mechanically polishing the inside surface, fire polishing the inside surface, washing the tube in hydrofluoric acid, or the like. A particularly suitable method of smoothing the inside wall of tube 24 comprises first mechanically polishing the rough surface left by core drilling and thereafter flame polishing the mechanically polished surface. Hydrofluoric acid washing of the surface before and after all polishing operations is desirable to avoid contamination.

After the inside surface of tube 24 is smoothed, the first of a plurality of layers 26 of glass may be applied thereto by the same flame hydrolysis method described in connection with the embodiment of FIGS. 1 and 2. After the first layer 26 is applied to the inside surface of tube 24, the gas-vapor mixture is changed for each successive layer 26 so that each of the plurality of layers have a composition whereby the desired radially varying composition is obtained.

Layers 10 and 26 may be applied by a variety of methods including but not limited to radio frequency sputtering, sintering a coating of soot applied by the flame hydrolysis process, chemical vapor deposition, depositing a glass frit, and the like. Still another suitable method of forming layers 10 and 26 comprises applying such layers by brushing, spraying, dipping, or the like a mixture of glass forming-doping agent materials suspended in an organic resin vehicle. An example thereof is the mixture of type 220-C titanium resinate solution containing 4.2 percent by weight Ti and type 28-G silicon resinate solution containing 7 percent by weight Si. These materials are produced by Hanovia Division of Englehard Industries, Inc. of Neward, N.J. The amount of each of the constituents is varied to form a different mixture for each layer. After each layer is applied, as by dipping for example, it is dried and the next layer is applied. Thereafter the structure so formed is fired to burn-out or volatilize the organic vehicle and oxidize the remaining constituents to form a pure or doped glass layer. Of course, such firing can be performed after each layer is applied or after a plurality of layers are applied, as desired. Clearly, the first and successive layers may be applied by either the same or different methods.

The light focusing fiber waveguide of the present invention may be formed by a modification of the Nordberg process heretofore noted as follows. To form a waveguide in accordance with the embodiment of FIG. 4, a suitable tubular member is provided. Dry oxygen is then bubbled through a tank containing liquid silicon-tetrachloride $SiCl_4$, at a temperature of approximately 35°C. $SiCl_4$ vapors picked up by the oxygen are then passed through a gas-oxygen flame where they are hydrolyzed to form a soot, that is, minute glass particles of very pure $SiO_2$. The glass soot leaves the flame in a steady stream and is deposited on the inside wall of the glass tube by directing the stream of soot at an open end of the tube. The thickness of the soot layer is controlled by the flow rates, distance between the glass tube and the flame, inside diameter of the glass tube, and the time allowed for deposition. Uniformity of the soot layer is greatly enhanced if a slight vacuum is applied to the end of the tube opposite the flame.

The Nordberg process may be similarly modified to provide titanium doped fused silica as subsequent layers 26 on the inside of the tubular member. For the second coating, dry oxygen is bubbled through a tank containing a liquid mixture of approximately 99.916 percent by weight silicon-tetrachloride, $SiCl_4$, and 0.084 percent by weight titanium-tetrachloride, $TiCl_4$, which mixture is at a temperature of approximately 35°C. $SiCl_4$ and $TiCl_4$ vapors picked up by the oxygen are then passed through a gas-oxygen flame where they are hydrolyzed to form a soot, that is, minute glass particles with a composition of approximately 99.993 percent by weight $SiO_2$ and 0.007 percent by weight $TiO_2$. The glass soot leaves the flame in a steady stream and is deposited on the inside wall of a glass tube to the desired thickness, for example, about 0.0175 inch, by directing the stream of soot at an open end of the tube. The thickness and uniformity of the soot layer is controlled as described in connection with first layer 26. The subsequent layers 26 may be similarly applied by the modified Nordberg process with the amount of the $TiO_2$ dopant in each successive layer being changed to provide the desired composition of each respective layer.

The tube and soot layers are then heated until the soot sinters resulting in thin layers of pure and titanium doped fused silica glass bonded to the inside wall of the outside tube.

Although the hereinabove soot process is described as having all of the soot layers sintered at one time, it will be understood that any one or more of the layers may be sintered and thereafter one or more additional layers may be applied and sintered, and so on, if desired.

It will also be understood that a light focusing optical fiber waveguide may be formed in accordance with the embodiment illustrated in FIGS. 1 and 2, as described above, except that layers 10 thereof would be applied in reverse order of that described in connection with FIG. 4. Also, if desired, the starting member may be of the composition desired at the center, therefore, it would not have to be removed.

Figure 6:
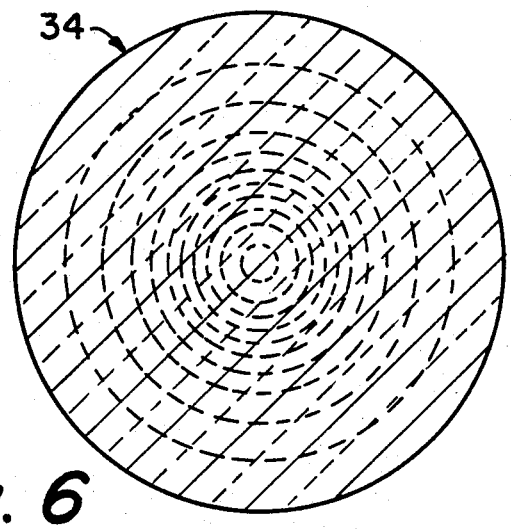
FIG. 6 is a cross section taken along line 6—6 of FIG. 5.
Figure 5:
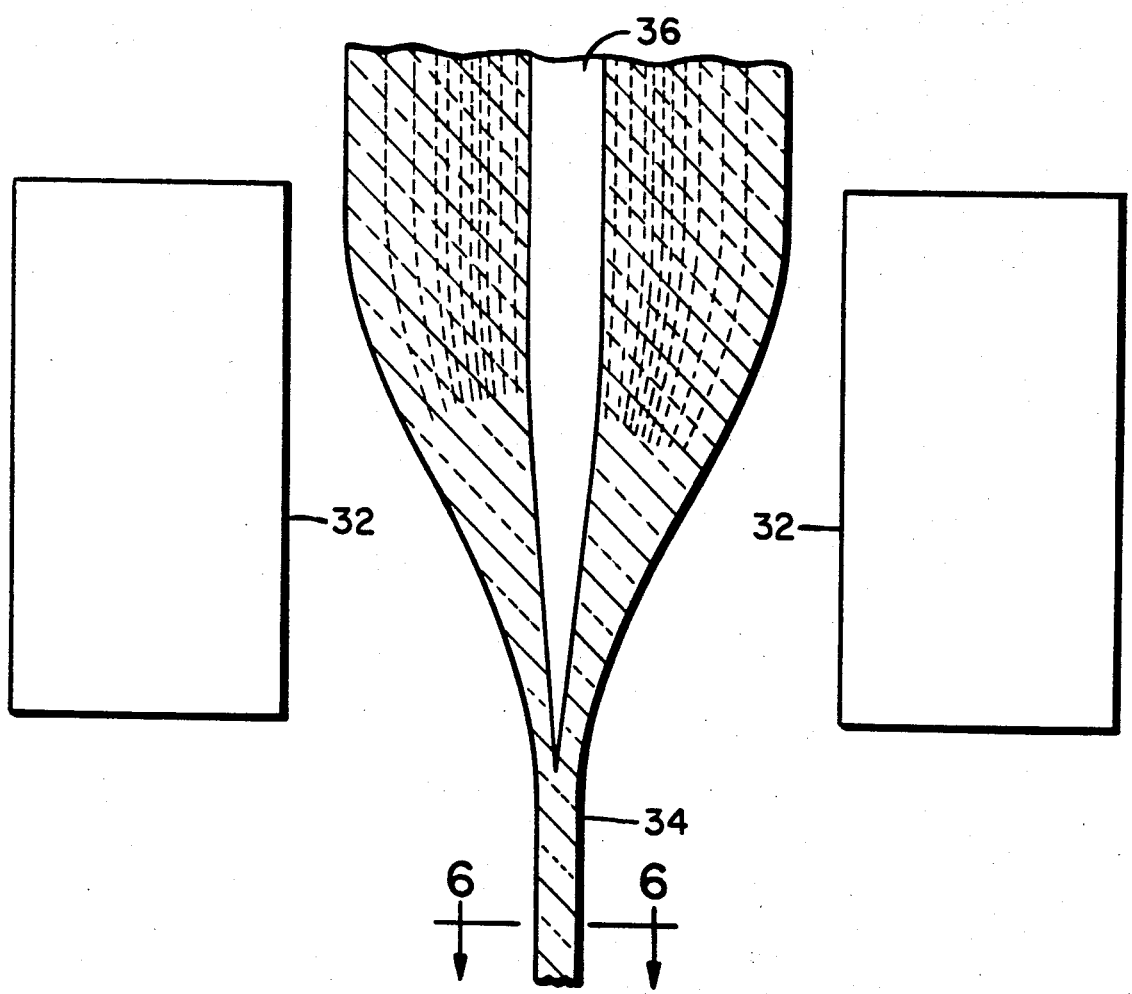
FIG. 5 is a fragmentary elevation partly in cross section of an optical fiber being formed.

After structure 28 of FIG. 3 is formed by removing the starting member, or structure 30 of FIG. 4 is formed as hereinabove described, it is either maintained at the desired temperature or heated to the desired temperature by any suitable heating means such as furnace 32 as illustrated in FIG. 5. After the structure reaches a temperature at which the materials have a low enough viscosity for drawing, it is then drawn until longitudinal hole 36 collapses, that is the inner layer of glass fills hole 36 to form a solid rod. The resulting structure is drawn until the cross sectional size thereof is reduced sufficiently to produce monolithic fiber 34. Such a fiber thereafter forms the light focusing fiber waveguide. In FIG. 6, there is illustrated the cross-sectional view of fiber 34 drawn to the desired cross-sectional dimensions. It is to be understood that, if the starting member is not removed from structure of the embodiment illustrated in FIGS. 1 and 2, the resulting structure may nevertheless be drawn as hereinabove described, except that no longitudinal hole will be collapsed.

Figure 7:
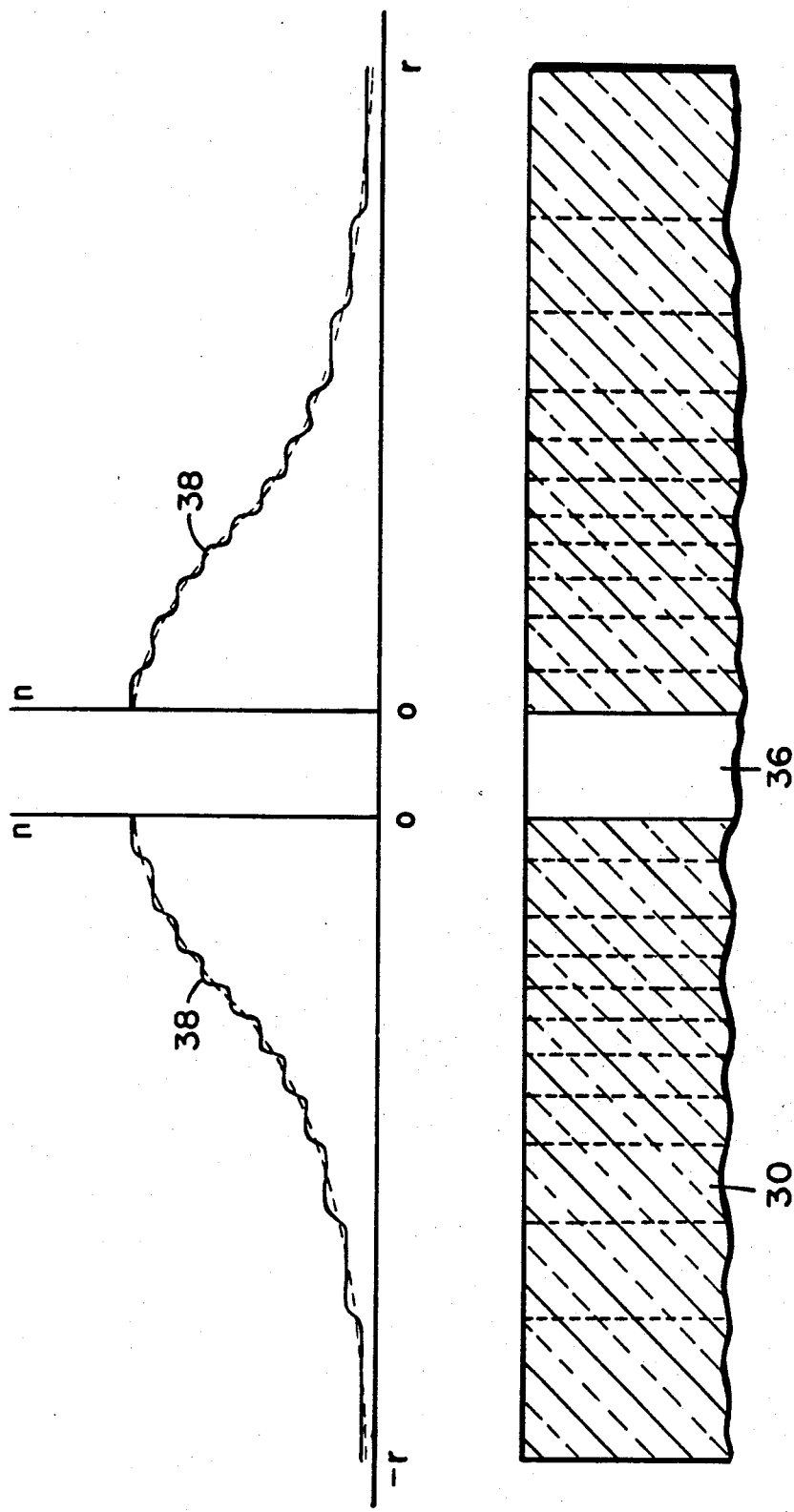
FIG. 7 is an illustration of the stepped radially varying composition of the structure of the present invention.

Referring to FIG. 7, there is illustrated, partly by graph, structure 30 having a stepped radially varying composition which produces a stepped radially varying index of refraction n illustrates by stepped curve 38. Curve 38 is illustrated in two portions separated by hole 36. The illustration of structure 28 will, of course, be substantially the same as that shown in FIG. 7.

Figure 9:
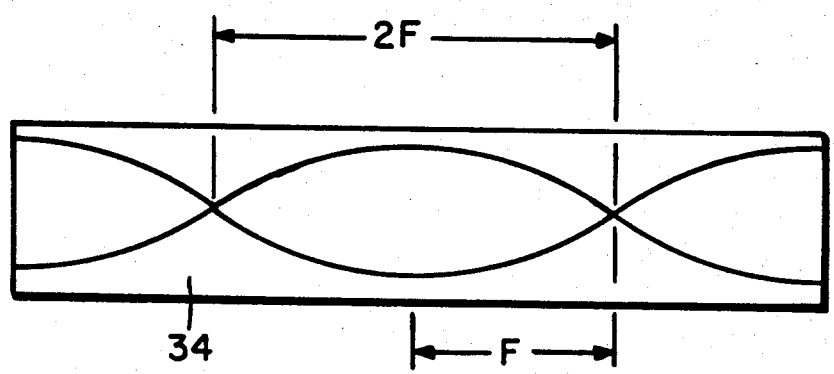
FIG. 9 is an illustration showing the focal length of a waveguide formed in accordance with the present invention.

An example of forming an article having a radially varying composition which is suitable for use as a light focusing fiber waveguide may have parameters defined by the equation $$n_r = n_o \operatorname{sech} \pi r/2F,$$

where $n_r$ is the index of refraction at a point in the article having radius $r$, $n_o$ is the refractive index at the center of the article and $F$ is the focal length. The refractive index inside an article in the form of a right circular cylinder is a function of only the radius at that point. Light rays incident on the cylinder traveling parallel to the longitudinal axis thereof, will be brought to focus at a distance along the article equal to the focal length. An example of the means for determining and coordinating the values in the above equation may be as follows. If a doped fused silica light focusing fiber waveguide is to be formed having a 5 mil diameter, an index of refraction at the center $n_o$ of approximately 1.4662, and an index of refraction $n_r$ at the periphery of the waveguide of 1.4584 (the index of refraction of 1.4584 is generally accepted for pure fused silica for sodium light having a wavelength of $\lambda = 5893$ A), then according to the above equation, the focal length F of such a light focusing fiber waveguide would be 2.75 mm. This is illustrated, partly by graph, in FIG. 8 wherein a light focusing fiber waveguide 34 has a stepped radially varying composition resulting in a stepped radially varying index of refraction as illustrated by stepped curve 40. The index of refraction illustrated by curve 40 is shown to substantially vary in accordance with sech $\pi r/2F$. The focal length F of waveguide 34 is illustrated in FIG. 9.

As has been described herein, the present structure has a plurality of layers with each layer containing a varying amount of dopant. Therefore, as such a structure is heated, as during sintering and drawing for example, diffusion of the dopant from one layer to another will result. Such diffusion will alter the stepped nature of the radially varying composition to more closely approximate a smooth curve. That is, the steps of the radially varying composition and index of refraction will not ordinarily be sharp steps as a practical matter, rather will be rounded as a result of the dopant diffusion. This is illustrated by the graphs shown in FIGS. 7 and 8. Further, such diffusion may tend to reduce the number of steps or layers that is necessary to achieve a particular desired radial variation. As used herein, the term stepped shall mean rounded steps as hereinabove described or sharp steps, if that be the case.

Although structures 28 and 30 have substantially larger diameters than fiber waveguide 34 which is formed from such structures, and although structures 28 and 30 may have a central hole 36, the radially varying index of refraction of the fiber waveguide follows substantially the same curve as do the structures. Therefore, 38 illustrated in FIG. 7 is substantially the same curve as curve 40 llustated n fg except tat te g pont of curve 38 is at both edges of central hole 36. As herein described, thishole is collapsed during subsequent drawing wherein the index of refraction about the periphery becomes the ultimate index of refraction at the central point of the fiber waveguide.

A specific example of a light focusing fiber waveguide produced by the method of the present invention is as follows. A starting member of fused quartz, approximately one-eighth inch in diameter and about 10 inches long is sealed to a suitable handle. Liquid $SiCl_4$ maintained at a temperature of 20°C. is provided in a first container and liquid $TiCl_4$ maintained at a temperature of 88°C. is provided in a second container. The vapor pressure of each of these liquids at the noted temperatures is 190 mm Hg. Dry oxygen is bubbled through both liquids so that vapors of each are picked up by the oxygen. Oxygen is initially bubbled through the liquid $SiCl_4$ at the rate of 5,000 cc. per minute and through the liquid $TiCl_4$ at the rate of 118 cc. per minute. Under these conditions, the vapors entrained within the oxygen comprise 2.3 mole percent $TiCl_4$ and 97.7 mole percent $SiCl_4$. This ratio of vapors, when hydrolyzed within the flame of a flame hydrolysis burner provides a soot composition of 3 percent by weight $TiO_2$ and 97 percent by weight $SiO_2$ having an index of refraction of 1.4662 for light having a wavelength of 5893 A. This soot is deposited as a layer having a thickness of 0.0175 inch onto the rotating and translating starting member. After the first soot layer is applied, the flow of dry oxygen through the $TiCl_4$ liquid is decreased to approximately 117.7 cc. per minute to yield a second soot layer of decreased $TiO_2$ content. After each layer is applied the flow of dry oxygen through the $TiCl_4$ liquid is incrementally decreased to permit the application of a plurality of layers each having a progressively decreasing $TiO_2$ content and consequently a progressively decreasing index of refraction until the outer layer is pure $SiO_2$. Each incremental decrease in the oxygen flow rate is selected to provide the desired ultimate stepped radially varying composition. In accordance with the above parameters, a composite structure 8 inches long by 2 inches in diameter and having approximately 60 layers may be produced in about 1½ hours. Thereafter, these plurality of layers of soot are sintered in an induction furnace having an oxygen atmosphere at about 1,500°C. The fused quartz starting member is ground out by means of a diamond reamer either before or preferably after the sintering step. The tubular member so formed is rinsed in about 50 percent hydrofluoric acid solution, flame polished, and washed again in said acid solution to provide a clean tubular member having an approximate outside diameter of about 1¾ inches after sintering. The structure is then placed in an induction furnace, heated, and drawn in an oxygen atmosphere at about 2,000°C. As the structure is drawn, it decreases in diameter and the central hole collapses. Drawing is continued until the final desired waveguide dimensions are obtained. For a typical final waveguide outside diameter of 5 mils, the waveguide focal length for the above-described waveguide will be about 2.75 mm.

Ordinarily, the relationship between the composition variation and the variation of the index of refraction is substantially linear as in the specific example described hereinabove, however, this relationship may be different depending at least in part on the materials employed.

Although the present invention has been described with respect to specific details of certain embodiments thereof, it is not intended that such details be limitations upon the scope of the invention except insofar as set forth in the following claims.

I claim:

1. A method of forming an article having a stepped radially varying composition comprising the steps of
   providing a solid substantially cylindrical starting member having a smooth outside peripheral surface,
   applying a plurality of distinct and successive layers of particulate material to said smooth outside peripheral surface of said solid cylindrical member, each such distinct layer having a substantially uniform composition therethrough but having a progressively different composition from the preceding layer so as to form a structure having a stepped radially varying composition, the composition of each said layer forming one of the steps,
   heating the structure so formed to the drawing temperature of the materials thereof, and
   drawing the heated structure to reduce the cross-sectional area thereof and to form an article having a stepped radially varying composition.

2. The method of claim 1 wherein said article is transparent and the stepped radially varying composition provides a stepped radially varying index of refraction substantially in accordance with the equation $$n_r = n_o \operatorname{sech} \pi r/2F$$

where $n_o$ is the index of refraction at the center of said article, $n_r$ is the index of refraction at any point at a distance $r$ from the center of said article, and F is the focal length of said article.

3. The method of claim 1 further comprising the step of removing said cylindrical starting member wherein said drawing step reduces the cross sectional area of the heated structure to collapse the hole resulting from removing said starting member and to form a fiber having a solid cross-section.

4. The method of claim 1 wherein the applying of at least one of said plurality of layers is accomplished by the steps of
   rotating said member about the longitudinal axis thereof, entraining in a gaseous medium predetermined amounts of each of a plurality of constituents in vapor form, and hydrolyzing said vapors in a flame to form a soot having a predetermined composition, applying said soot to the exterior peripheral surface of said member.

5. The method of claim 4 further comprising the step of sintering said soot.

6. The method of claim 5 further comprising the steps of removing said starting member by drilling,
mechanically polishing the drilled surface, and
flame polishing the mechanically polished surface.

7. The method of claim 6 further comprising the step of hydrofluoric acid washing of said drilled surfaces following each polishing step.

8. The method of claim 5 wherein said soot is fused silica at least initially doped with at least one material selected from the group consisting of titanium oxide, tantalum oxide, tin oxide, niobium oxide, zirconium oxide, aluminum oxide, lanthanum oxide, and germanium oxide.

9. The method of claim 8 wherein said soot is doped with not more than 25 percent by weight titanium oxide at the center thereof.

10. The method of claim 5 wherein the sintering and drawing steps are accomplished during the same heating operation.

11. The method of claim 5 wherein said drawing is performed in a substantially oxygen atmosphere.

12. The method of claim 1 wherein said plurality of layers of materials are formed of fused silica that is at least initially doped.

13. The method of claim 1 wherein at least one of said plurality of layers of material is applied by radio frequency sputtering.

14. The method of claim 1 wherein at least one of said plurality of layers of materials is applied by chemical vapor deposition.

15. The method of claim 1 wherein at least one of said plurality of layers of material is formed by applying a glass frit to the exterior surface of said starting member and thereafter sintering said frit.

16. The method of claim 1 wherein at least one of said plurality of layers of material is formed by applying a mixture of glass forming-doping agent materials suspended in an organic vehicle and thereafter firing such layer to volatilize the organic vehicle.

17. A light focusing fiber waveguide formed by the method of claim 1.

18. A method of forming an article having a stepped radially varying composition comprising the steps of providing a substantially cylindrical tubular starting member having a smooth inside surface, applying to said smooth inside surface of said tubular member a plurality of distinct and successive layers of particulate material, each such distinct and successive layer having a substantially uniform composition therethrough but having a progressively different composition from the preceding layer so as to form a structure having a stepped radially varying composition, the composition of each of said layer forming one of the steps, heating the structure so formed to the drawing temperature of the materials thereof, and drawing the heated structure to reduce the cross-sectional area thereof and to collapse the remaining inner hole to form a fiber having a solid cross-section.

19. The method of claim 18 wherein at least one of said plurality of layers is applied by flame hydrolysis as a soot.

20. The method of claim 19 further comprising the step of sintering said soot.

21. The method of claim 20 wherein sintering and drawing the structure is accomplished during the same heating step.

22. The method of claim 21 wherein said heated structure is drawn in an oxygen atmosphere.

23. The method of claim 20 wherein said layer material is fused silica doped with at least one material selected from the group consisting of titanium oxide, tantalum oxide, tin oxide, niobium oxide, zirconium oxide, aluminum oxide, lanthanum oxide, and germanium oxide.

24. The method of claim 23 wherein the material of the innermost layer is doped with not more than 25 percent by weight titanium oxide.

25. The method of claim 19 wherein said drawing is performed in a substantially oxygen atmosphere.

26. The method of claim 18 wherein said article is transparent and the stepped radially varying composition provides a stepped radially varying index of refraction substantially in accordance with the equation $$n_r = n_o \operatorname{sech} \pi r/2F$$

where $n_o$ is the index of refraction at the center of said article, $n_r$ is the index of refraction at any point at a distance $r$ from the center of said article, and $F$ is the focal length of said article.

27. A light focusing fiber waveguide formed by the method of claim 18.

28. The method of claim 18 wherein at least one of said plurality of layers of material is applied by radio frequency sputtering.

29. The method of claim 18 wherein at least one of said plurality of layers of material is applied by chemical vapor deposition.

* * * * *